US010978808B2

(12) United States Patent
Walker

(10) Patent No.: US 10,978,808 B2
(45) Date of Patent: Apr. 13, 2021

(54) PHASED ARRAY LINE FEED FOR REFLECTOR ANTENNA

(71) Applicant: ARIZONA BOARD OF REGENTS ON BEHALF OF THE UNIVERSITY OF ARIZONA, Tucson, AZ (US)

(72) Inventor: Christopher K. Walker, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 100 days.

(21) Appl. No.: 15/744,625

(22) PCT Filed: Jul. 15, 2016

(86) PCT No.: PCT/US2016/042462
§ 371 (c)(1),
(2) Date: Jan. 12, 2018

(87) PCT Pub. No.: WO2017/011732
PCT Pub. Date: Jan. 19, 2017

(65) Prior Publication Data

US 2018/0212334 A1 Jul. 26, 2018

Related U.S. Application Data

(60) Provisional application No. 62/193,474, filed on Jul. 16, 2015.

(51) Int. Cl.
*H01Q 15/14* (2006.01)
*H01Q 3/24* (2006.01)
(Continued)

(52) U.S. Cl.
CPC ............ *H01Q 15/14* (2013.01); *G01S 13/02* (2013.01); *H01Q 3/245* (2013.01); *H01Q 3/26* (2013.01);
(Continued)

(58) Field of Classification Search
CPC .... H01Q 19/17; H01Q 25/007; H01Q 5/0079; H01Q 13/025; H01Q 13/04; H01Q 1/246;
(Continued)

(56) References Cited

U.S. PATENT DOCUMENTS 3,983,562 A * 9/1976 Blanchard ............. H01Q 19/17 343/815
4,427,984 A 1/1984 Anderson
(Continued)

FOREIGN PATENT DOCUMENTS

JP H075083 U 1/1995
WO WO/2010/101468 A1 9/2010

OTHER PUBLICATIONS

10 Meter Sub-orbital Large Balloon Reflector, 2014 IEEE Aerospace Conference, Jun. 19, 2014 (Year: 2014).*
(Continued)

*Primary Examiner* — Ricardo I Magallanes
(74) *Attorney, Agent, or Firm* — Blank Rome LLP

(57) ABSTRACT

A phased array line feed for a reflector antenna, including a plurality of substantially parallel metallic rods and a phase/power switching matrix electrically connected to the metallic rods. The phase/power switching matrix may steer a beam of the reflector antenna by adjusting the phase and/or power difference between the metallic rods. The phased array line feed may also include a plurality of substantially parallel metallic disks. The metallic rods may extend through the metallic disks substantially perpendicular to the metallic discs. The metallic discs may be equally spaced and
(Continued)

the diameter of the metallic disks may decrease along the length of the metallic rods. Alternatively, the diameters of the metallic discs may be equal and the distances between the metallic discs may decrease along the length of the metallic rods.

24 Claims, 3 Drawing Sheets

(51) Int. Cl.

| | |
|---|---|
| ***H01Q 21/00*** | (2006.01) |
| ***G01S 13/02*** | (2006.01) |
| ***H01Q 21/20*** | (2006.01) |
| ***H01Q 3/26*** | (2006.01) |
| ***H01Q 21/06*** | (2006.01) |
| *H01Q 19/15* | (2006.01) |

(52) U.S. Cl.
CPC ....... *H01Q 21/0006* (2013.01); *H01Q 21/061* (2013.01); *H01Q 21/20* (2013.01); *H01Q 19/15* (2013.01)

(58) Field of Classification Search
CPC ...... H01Q 15/163; H01Q 15/14; H01Q 3/245; H01Q 13/02; B64G 2001/224; G01S 13/02
USPC ......................... 343/779, 775, 780, 781, 834
See application file for complete search history.

(56) References Cited

U.S. PATENT DOCUMENTS

| | | | | |
|---|---|---|---|---|
| 4,819,003 | A | 4/1989 | Goto et al. | |
| 5,115,248 | A | 5/1992 | Roederer | |
| 6,252,562 | B1 * | 6/2001 | Diez | H01Q 3/30 342/375 |
| 7,224,322 | B1 * | 5/2007 | Ghaleb | H01Q 1/082 342/10 |
| 7,438,261 | B2 * | 10/2008 | Porter | B64B 1/06 244/123.11 |
| 7,498,989 | B1 * | 3/2009 | Volman | H01Q 1/287 343/700 MS |
| 2003/0164805 | A1 | 9/2003 | Strickland | |
| 2005/0179615 | A1 * | 8/2005 | Mrstik | H01Q 15/163 343/915 |
| 2007/0257856 | A1 | 11/2007 | Peterson | |
| 2008/0030420 | A1 | 2/2008 | Lee et al. | |
| 2008/0291098 | A1 | 11/2008 | Kish et al. | |
| 2009/0262037 | A1 * | 10/2009 | Matyas | H01Q 19/12 343/779 |
| 2011/0109507 | A1 | 5/2011 | Warnick | |
| 2011/0227776 | A1 | 9/2011 | Webb | |
| 2012/0133549 | A1 | 5/2012 | Culkin et al. | |

OTHER PUBLICATIONS

Supplementary Search Report of European Application No. 16825239.3.

* cited by examiner

PHASED ARRAY LINE FEED FOR REFLECTOR ANTENNA

CROSS-REFERENCE TO RELATED APPLICATIONS

This application is a U.S. National Stage Application of International Application No. PCT/US2016/042462, filed Jul. 15, 2016, which claims priority to U.S. Provisional Application No. 62/193,474, filed Jul. 16, 2015, which is incorporated herein by reference in its entirety. This application is also related to U.S. patent application Ser. No. 15/154,760 filed May 13, 2016, which is also incorporated herein by reference in its entirety.

STATEMENT REGARDING FEDERALLY SPONSORED RESEARCH

Not applicable.

BACKGROUND

As described in U.S. patent application Ser. No. 15/154,760, conventional high gain space antennas are expensive to transport into space and place in orbit because of their size, weight, and inability to collapse in three dimensions. In order to overcome these and other disadvantages of the prior art, U.S. patent application Ser. No. 15/154,760 discloses a balloon reflector antenna with an inflatable balloon and a mechanically steerable feed system (e.g., a line feed).

FIG. 1 is a diagram illustrating a satellite 100 with a large balloon reflector antenna 120 as deployed in space according to U.S. patent application Ser. No. 15/154,760. The balloon reflector antenna 120 includes a spherical balloon 140, which includes a surface transparent to electromagnetic waves 142 and a reflective surface 144 opposite the transparent surface 142. (The balloon 140 may also include one or more dielectric support curtains 146 to help the balloon 140 keep its spherical shape.) The satellite 100 also includes a balloon reflector canister 182, an RF module 184, a telecommunications module 186, a pitch reaction wheel 188, a roll reaction wheel 189, a power module 190, and solar cells 192.

The balloon reflector antenna 120 includes a feed system 160, which may be one or more feedhorns, one or more planar antennas, one or more spherical correctors such as a quasi-optical spherical corrector or a line feed (as illustrated in FIG. 1), or any other suitable device that receives electromagnetic waves that are reflected off the reflective surface 144 or emits electromagnetic waves that are reflected off the reflective surface 144.

When the balloon reflector antenna 120 receives a signal (e.g., from the ground), the signal passes through the transparent surface 142 and encounters the reflective surface 144, which focuses the signal into the feed system 160. When the balloon reflector antenna 220 transmits a signal (e.g., to the ground), the signal is emitted by the feed system 160 and encounters the reflective surface 144, which directs the signal through the transparent surface 142.

As shown in FIG. 1, a spherical reflective surface, such as the reflective surface 144, focuses parallel rays to a line (as opposed to a parabolic reflective surface, which focus parallel rays to a point). The simplest "corrector" for this spherical aberration is a line feed.

FIG. 2 is a diagram illustrating a prior art line feed 200.

As shown in FIG. 2, the prior art line feed 200 includes a long, circular wave guide 220 with periodic apertures 240 separated by external quarter wave plates 260. Because the line focus can be any radius of the spherical reflective surface, the antenna beam can easily be steered through large angles without degradation by rotating the line feed 200.

Referring back to FIG. 1, the feed system 160, which may be a line feed similar to the line feed 200 illustrated in FIG. 2, extends from the center of the balloon 140 along one or more radial lines of the balloon 140. In order to focus the balloon reflector antenna 120, the feed system 160 includes the motorized mount 162 to move the feed system 160 radially. As described in U.S. patent application Ser. No. 15/154,760, pivoting the feed system 160 enables the beam to be steered without rotating the entire satellite 100. However, redirecting the beam by pivoting the feed system 260 presents another problem.

Because the satellite 100 is deployed in space, pivoting the feed system 160 (or moving any other part of the satellite 100) will unintentionally cause the entire satellite 100 to move off course (unless an equal and opposite force is applied). Accordingly, there is a need for an electrically steerable feed system that can redirect the beam of a reflector antenna while remaining stationary. Additionally, in terrestrial applications, there is a need for an electrically steerable feed system to reduce or eliminate the need for mechanical satellite tracking systems.

SUMMARY

In order to overcome those and other drawbacks, there is provided a phased array line feed for a reflector antenna (e.g., a spherical balloon reflector antenna for space or terrestrial use), including a plurality of substantially parallel metallic rods and a phase/power switching matrix electrically connected to the metallic rods at the base of the line feed. The phase/power switching matrix may steer a beam of the reflector antenna by adjusting the phase and/or power difference between the metallic rods. The phased array line feed may also include a plurality of substantially parallel metallic disks. The metallic rods may extend through the metallic disks substantially perpendicular to the metallic disks. The metallic discs may be equally spaced (e.g., by a distance of approximately $\lambda/2$, where $\lambda$ is the wavelength of interest of the reflector antenna) and the diameter of the metallic disks may decrease along the length of the metallic rods (e.g., from approximately $\lambda/1.1$ at the base of the line feed to $\lambda/1.8$ at the vertex). Alternatively, the diameters of the metallic discs may be equal and the distances between the metallic discs may decrease along the length of the metallic rods.

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments, wherein.

DETAILED DESCRIPTION

Figure 1:
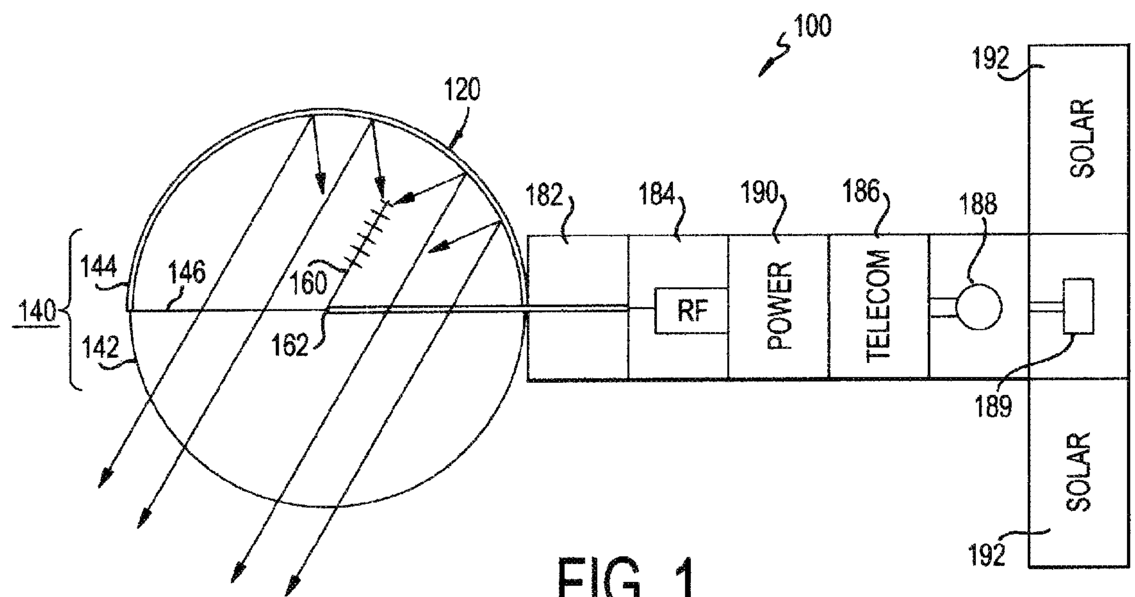
FIG. 1 is a diagram illustrating a satellite with a spherical balloon reflector antenna according to U.S. patent application Ser. No. 15/154,760.

Preferred embodiments of the present invention will be set forth in detail with reference to the drawings, in which like reference numerals refer to like elements or steps throughout.

Figure 3:
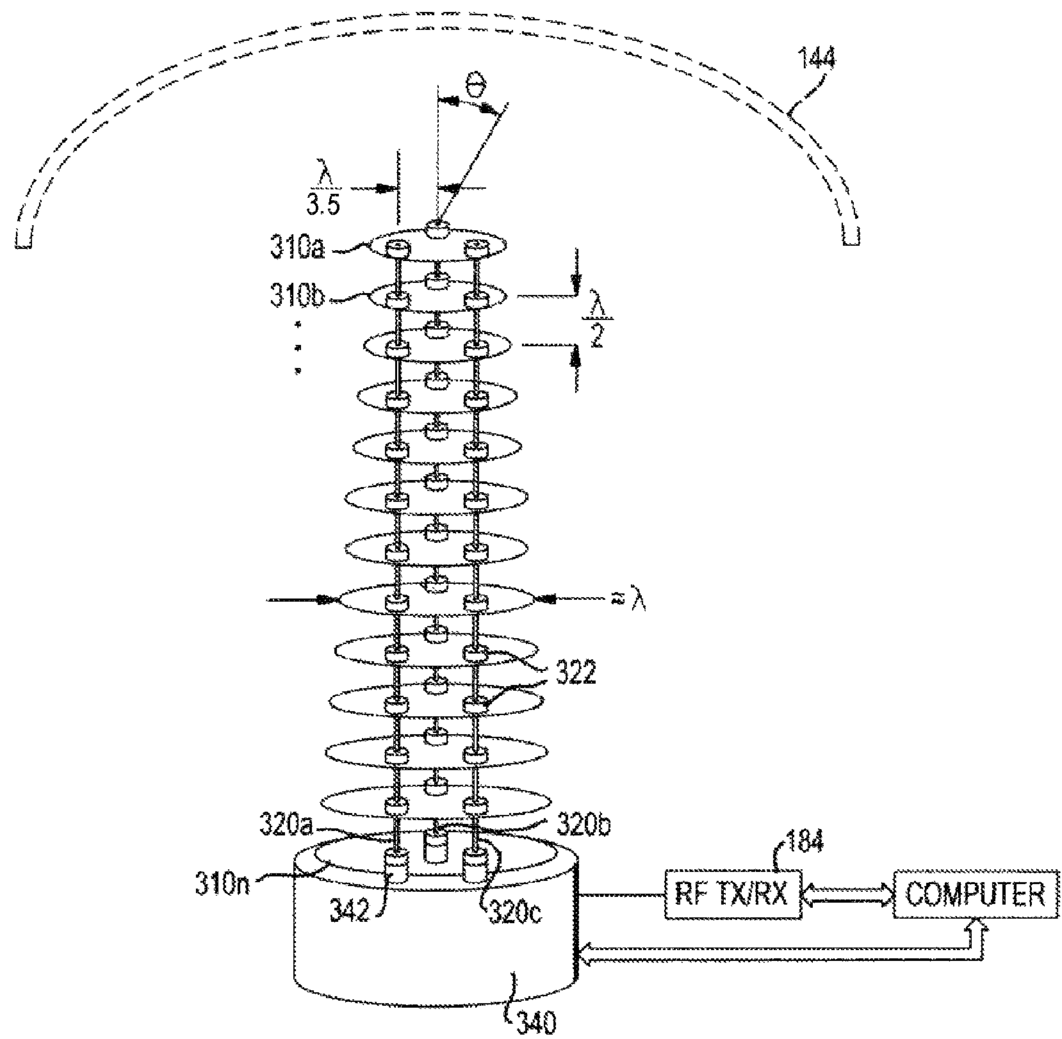
FIG. 3 is a diagram illustrating a phased array line feed for a reflector antenna according to an exemplary embodiment of the present invention.

FIG. 3 is a diagram illustrating a phased array line feed 300 for a reflector antenna that operates at a wavelength of interest λ (e.g., the spherical reflective surface 144 illustrated in FIG. 1) according to an exemplary embodiment of the present invention.

As shown in FIG. 3, the phased array line feed 300 includes a plurality of (e.g., 3 or more) metallic rods 320*a*-320*c* and a phase/power switching matrix 340. The phase/power switching matrix 340 is electrically connected to each of the metallic rods 320*a*-320*c*, for example via coaxial connectors 342. The phased array line feed 300 may also include a plurality of metallic disks 310*a*-310*n*. The metallic rods 320*a*-320*c* may pass through the metallic discs 310*a*-310*n*, for example via coaxial feedthroughs 322.

The metallic disks 310*a*-310*n* are substantially parallel. The metallic rods 320*a*-320*c* may be arranged in a circular pattern (embodiments with three metallic rods 320*a*-320*c*, for example, may form a triangular pattern). At the base of the phased array line feed 300, the metallic rods 320*a*-320*c* may be separated by a distance of approximately λ/3.5 center-to-center. The metallic rods 320*a*-320*c* may be substantially parallel and pass through each of the metallic disks 310*a*-310*n* substantially perpendicular to the metallic disks 310*a*-310*n*. For example, the rods may be angled inward at an angle of approximately 1 degree (e.g., 1 degree±0.1 degree).

In embodiments that include metallic discs 310*a*-310*n*, the metallic discs 310*a*-310*n* divide the phased array line feed 300 into a series of independent subarrays of λ/2 vertical antennas. In essence, each of the metallic discs 310*a*-310*n* acts as a ground plane for each of the subarrays. The emergent beam angle θ from each subarray is a function of the phasing within each subarray and the diameter of the metallic discs 310*a*-310*n* separating the subarrays. As illustrated in FIG. 1, illumination of a spherical reflector requires the emergent beam angle θ to vary along the length of the phased array line feed 300 with the largest emergent beam angle θ occurring at the end of the feed closest to the reflective surface 144. In the embodiment shown in FIG. 3, the emergent, beam angle θ varies along the length of the line feed, for example from 19 degrees to 64 degrees.

Figure 2:
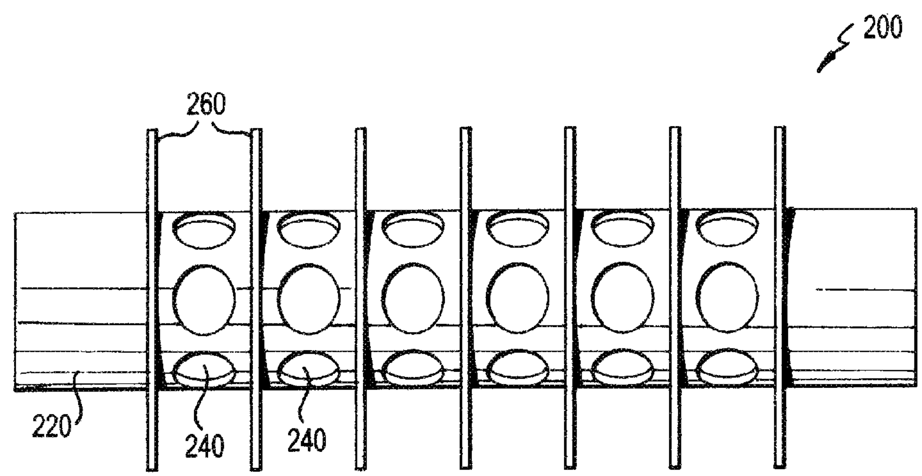
FIG. 2 is a diagram illustrating a prior art line feed.

Compared to a conventional, stationary line feed (e.g., the line feed 200 illustrated in FIG. 2), the length of the phased array line feed 300 may be extended to intercept off-axis reflected rays that would otherwise be missed by the conventional line feed. To achieve scan angles of ±30 degrees, the length of the line feed may be approximately 12 percent (e.g., 12±1 percent) of the diameter of the spherical reflector being illuminated (e.g., the reflective surface 144).

In the embodiment illustrated in FIG. 3, the metallic disks 310*a*-310*n* may be equally spaced along the length of the metallic rods and the diameter of the metallic disks may decrease from the base to the vertex of the line feed. For example, the metallic disks 310*a*-310*n* may be separated by a distance of approximately λ/2 (e.g., λ/2±0.13) and the metallic discs may have a diameter of approximately λ/1.1 at the base of the line feed to approximately λ/1.8 at the vertex.

Figure 4:
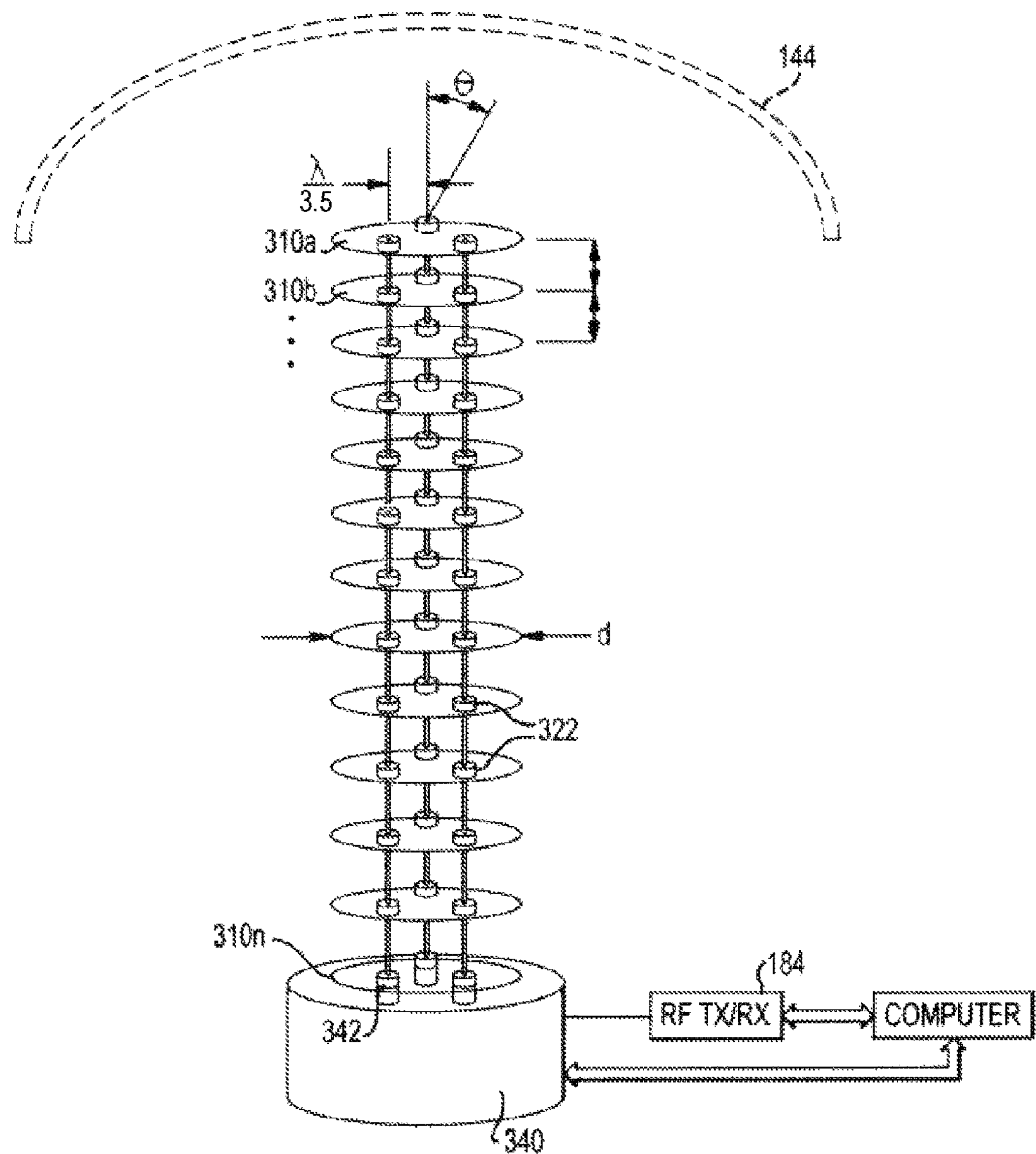
FIG. 4 is a diagram illustrating a phased array line feed for a reflector antenna according to another exemplary embodiment of the present invention.

FIG. 4 is a diagram illustrating a phased array line feed 400 for a reflector antenna that operates at a wavelength of interest λ (e.g., the spherical reflective surface 144 illustrated in FIG. 1) according to another exemplary embodiment of the present invention.

Similar to the phased array line feed 300 illustrated in FIG. 3, the phased array line feed 400 includes a plurality of (e.g., 3 or more) substantially parallel metallic rods 320*a*-320*c* and a phase/power switching matrix 340 electrically connected to each of the metallic rods 320*a*-320*c* (e.g., via coaxial connectors 342). The phased array line feed 400 may also include a plurality of substantially parallel metallic disks 310*a*-310*n*. The metallic rods 320*a*-320*c* may pass through the metallic disks 310*a*-310*n* (e.g., via coaxial feedthroughs 322) perpendicular to the metallic disks 310*a*-310*n* Again, the length of the phased array line feed 400 may be extended to approximately 12 percent (e.g., 12±1 percent) of the diameter of the spherical reflector being illuminated (e.g., the reflective surface 144) to intercept off-axis reflected rays that would otherwise be missed by a conventional, stationary line feed (e.g., the line feed 200 illustrated in FIG. 2).

In the embodiment illustrated in FIG. 3, diameters d of the metallic disks 310*a*-310*n* may be substantially equal. Similar to the phased array line feed 300 illustrated in FIG. 3, the metallic discs 310*a*-310*n* divide the phased array line feed 400 into a series of independent subarrays of λ/2 vertical antennas. In order for the emergent beam angles θ from each subarray to vary along the length of the phased array line feed 400 (e.g., from 19 degrees to 64 degrees), the distances between the metallic disks 310*a*-310*n* decrease from the base of the phased array line feed 400 to the vertex of the phased array line feed 400.

Each of the phased array line feeds 300 and 400 create an electrically steerable beam that illuminates the surface of the reflector antenna (e.g., the reflective surface 144) without rotating the phased array line feed 300 or 400. The phase/power switching matrix 340 steers the beam, by adjusting the phase and/or power difference between the metallic rods 320*a*-320*c*.

A mathematical description of the resulting beam pattern from the phased array line feed 300 or 400 can be derived using the principle of pattern multiplication. Assuming the geometry of each radiating element in the array (here, a metallic rod 320 with metallic disks 310) is the same, then the combined radiation pattern may be prescribed, for example, by Equation 1:

$$f_a(\theta, \phi) = f_0(\theta, \phi) \sum_{n=1}^{N} V_n e^{jkd_n \sin\theta\cos\phi} \qquad \text{Eq. 1}$$

where $f_a(\theta, \phi)$ = resulting radiation pattern $f_0(\theta, \phi)$ = common radiation pattern of each array element $V_n = A_n e^{j\alpha_n}$ = complex excitation to each element $A_n$ = signal amplitude at each element $\alpha_n$ = phase at each element -continued $d_n$ = element spacing relative to center of array $k = \frac{2\pi}{\lambda}$ = propagation constant $\theta$ = polar angle $\phi$ = azimuthal angle $\lambda$ = wavelength of operation $n$ = element number (e.g., 1, 2, 3, *etc.*)

The above expression for $f_a(\theta,\phi)$ may also be presented in vector form as shown, for example, in Equation 2. The normalized power pattern, $P_n(\theta,\phi)$, of the array is then:

$$P_n(\theta, \phi) = \frac{|f_a(\theta, \phi)|^2}{|f_{max}|^2} \quad \text{Eq. 2}$$

where $f_{max}$ = maximum value of $f_a(\theta, \phi)$.

The foregoing description and drawings should be considered as illustrative only of the principles of the inventive concept. Exemplary embodiments may be realized in a variety of sizes and are not intended to be limited by the preferred embodiments described above. Numerous applications of exemplary embodiments will readily occur to those skilled in the art. Therefore, it is not desired to limit the inventive concept to the specific examples disclosed or the exact construction and operation shown and described. Rather, all suitable modifications and equivalents may be resorted to, falling within the scope of this application.

What is claimed is:

1. A reflector antenna, comprising:

a balloon with a reflective surface and a transparent surface opposite the reflective surface, the reflective surface creating a line of focus; and a phased array line feed that emits or receives electromagnetic waves along the line of focus, the phased array line feed comprising:

a plurality of substantially parallel disks inside the balloon;

a plurality of substantially parallel metallic rods, inside the balloon, that extend through the substantially parallel disks substantially perpendicular to the substantially parallel disks; and a phase/power switching matrix, electrically connected to the substantially parallel metallic rods, that steers a beam of the reflector antenna by adjusting a phase or power difference between the metallic rods.

2. The reflector antenna of claim 1, wherein the phase/power switching matrix steers the beam of the reflector antenna by adjusting the phase difference between the substantially parallel metallic rods.

3. The reflector antenna of claim 1, wherein the phase/power switching matrix steers the beam of the reflector antenna by adjusting the power difference between the substantially parallel metallic rods.

4. The reflector antenna of claim 1, wherein:

the substantially parallel disks are metallic, and each of the substantially parallel metallic rods extends from a base of the phased array line feed through the substantially parallel metallic disks to a vertex of the phased array line feed.

5. The reflector antenna of claim 4, wherein the substantially parallel metallic disks are spaced apart by a distance of approximately ½ of a wavelength of interest of the reflector antenna.

6. The reflector antenna of claim 4, wherein distances between the substantially parallel metallic disks decrease from a maximum at the base of the phased array line feed to a minimum at the vertex of the phased array line feed.

7. The reflector antenna of claim 4, wherein diameters of the substantially parallel metallic disks decrease from a maximum at the base of the phased array line feed to a minimum at the vertex of the phased array line feed.

8. The reflector antenna of claim 1, wherein the substantially parallel metallic rods are spaced apart at a base of the phased array line feed by a distance of approximately 1/3.5 of a wavelength of interest of the reflector antenna.

9. The reflector antenna of claim 1, wherein distances between the substantially parallel metallic rods decrease from a base of the phased array line feed base to a vertex of the phased array line feed.

10. The reflector antenna of claim 1, wherein the phased array line feed has a length of approximately 12 percent of the diameter of the reflector antenna.

11. The reflector antenna of claim 1, wherein the balloon is spherical.

12. The reflector antenna of claim 1, wherein:

the phased array line feed is configured to receive electromagnetic waves that pass through the transparent surface and are reflected off the reflective surface; and the phased array line feed is configured to emit electromagnetic waves that reflect off the reflective surface and pass through the transparent surface.

13. A method of making a reflector antenna having a wavelength of interest, the method comprising:

providing a balloon with a reflective surface and a transparent surface opposite the reflective surface, the reflective surface creating a line of focus; and providing a phased array line feed that emits or receives electromagnetic waves along the line of focus by:

providing a plurality of substantially parallel metallic disks inside the balloon;

providing a plurality of substantially parallel metallic rods, inside the balloon, that extend through the substantially parallel disks substantially perpendicular to the substantially parallel disks; and electrically connecting a phase/power switching matrix, which steers a beam of the reflector antenna by adjusting a phase or power difference between the metallic rods, to the substantially parallel metallic rods.

14. The method of claim 13, wherein the phase/power switching matrix steers the beam of the reflector antenna by adjusting the phase difference between the substantially parallel metallic rods.

15. The method of claim 13, wherein the phase/power switching matrix steers the beam of the reflector antenna by adjusting the power difference between the substantially parallel metallic rods.

16. The method of claim 13, wherein:

the substantially parallel disks are metallic, and each of the substantially parallel metallic rods extends from a base of the phased array line feed through the substantially parallel metallic disks to a vertex of the phased array line feed.

17. The method of claim 16, wherein the substantially parallel metallic disks are spaced apart by a distance of approximately ½ the wavelength of interest.

18. The method of claim 16, wherein distances between the substantially parallel metallic disks decrease from a maximum at the base of the phased array line feed to a minimum at the vertex of the phased array line feed.

19. The method of claim 16, wherein diameters of the substantially parallel metallic disks decrease from a maximum at the base of the phased array line feed to a minimum at the vertex of the phased array line feed.

20. The method of claim 13, wherein the substantially parallel metallic rods are spaced apart by a distance of approximately 1/3.5 the wavelength of interest at a base of the phased array line feed.

21. The method of claim 13, wherein distances between the substantially parallel metallic rods decrease from a base of the phased array line feed base to a vertex of the phased array line feed.

22. The method of claim 13, wherein the phased array line feed has a length of approximately 12 percent of the diameter of the reflector antenna.

23. The method of claim 13, wherein the balloon is spherical.

24. The method of claim 13, wherein:

the phased array line feed is configured to receive electromagnetic waves that pass through the transparent surface and are reflected off the reflective surface; and the phased array line feed is configured to emit electromagnetic waves that reflect off the reflective surface and pass through the transparent surface.

* * * * *